United States Patent [19]

Rugh et al.

[11] 4,340,262
[45] Jul. 20, 1982

[54] SPINDLE BEARING AND LUBRICATION SYSTEM

[75] Inventors: Clyde J. Rugh; John L. King, Jr., both of Owosso, Mich.

[73] Assignee: MWA Company, Owosso, Mich.

[21] Appl. No.: 175,557

[22] Filed: Aug. 5, 1980

[51] Int. Cl.³ .............................................. F16C 33/66
[52] U.S. Cl. ................................. 308/187; 308/207 R
[58] Field of Search ............... 308/187, 207 R, 189 R, 308/207 A, 189 A, 123, 121

[56] References Cited

U.S. PATENT DOCUMENTS

| | | | |
|---|---|---|---|
| 4,137,997 | 2/1979 | Ando | 308/187 |
| 4,235,486 | 11/1980 | Holtzclaw | 308/189 R |
| 4,262,978 | 4/1981 | Everett | 308/187 |

Primary Examiner—Lenard A. Footland
Attorney, Agent, or Firm—Whittemore, Hulbert & Belknap

[57] ABSTRACT

A spindle bearing and lubrication system having bearings supporting a shaft for rotation within a housing to which the outer bearing rings are keyed. End retainers and a spacer locate the bearings axially, and, with the bearings, define annular lubricant cavities on both sides of both bearings. Lubricant inlet passages lead through the housing and spacer to the lubricant cavities. Lubricant outlet passages lead from the lubricant cavities through slots in the bearings, in the retainers, in the key, and in the housing keyway, and finally through a filter which prevents the entry of solid contaminants in the event of reverse flow.

8 Claims, 2 Drawing Figures

SPINDLE BEARING AND LUBRICATION SYSTEM

This invention relates generally to bearings and refers more particularly to a spindle bearing and lubrication system.

BACKGROUND AND SUMMARY OF THE INVENTION

High speed bearings, for example those used to support a 4" shaft or spindle rotating at 2600 r.p.m. or so, generate considerable heat. The outer bearing rings or races have a tendency to slip during operation because of differential expansion, due to the fact that the housing is cooled by the ambiant air and hence is at a much lower temperature than the outer rings. (The inner bearing rings or races, being at substantially the same temperature as the shaft, have no tendency to slip when merely shrunk on the shaft.) Accordingly, it is often necessary to key the outer bearing rings to the housing.

It is also known that excessive lubricant in bearings of a high speed application can be detrimental in that such excessive lubricant tends to churn and develop heat. Therefore, it is an object of this invention to prevent excessive accumulation of lubricant by providing means for a regulated flow of lubricant and to incorporate such means in the arrangement for mounting and keying the spindle bearings.

Other objects and features of the invention will become apparent as the following description proceeds, especially when considered with the accompanying drawings.

DETAILED DESCRIPTION

Figure 2:
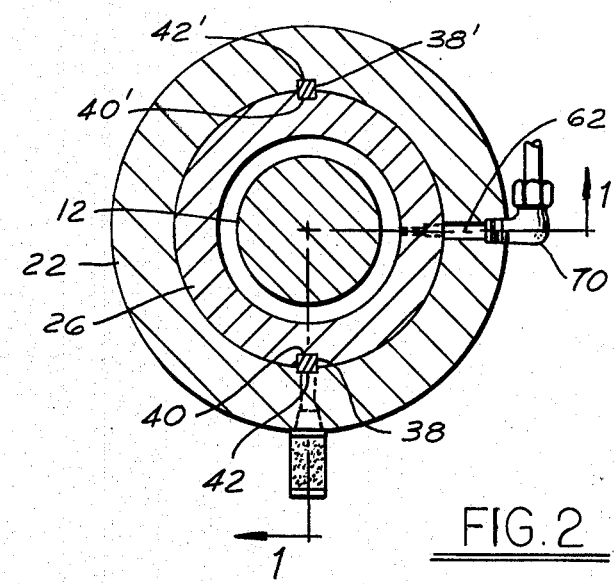
FIG. 2 is a sectional view taken on the line 2—2 in FIG. 1.
Figure 1:
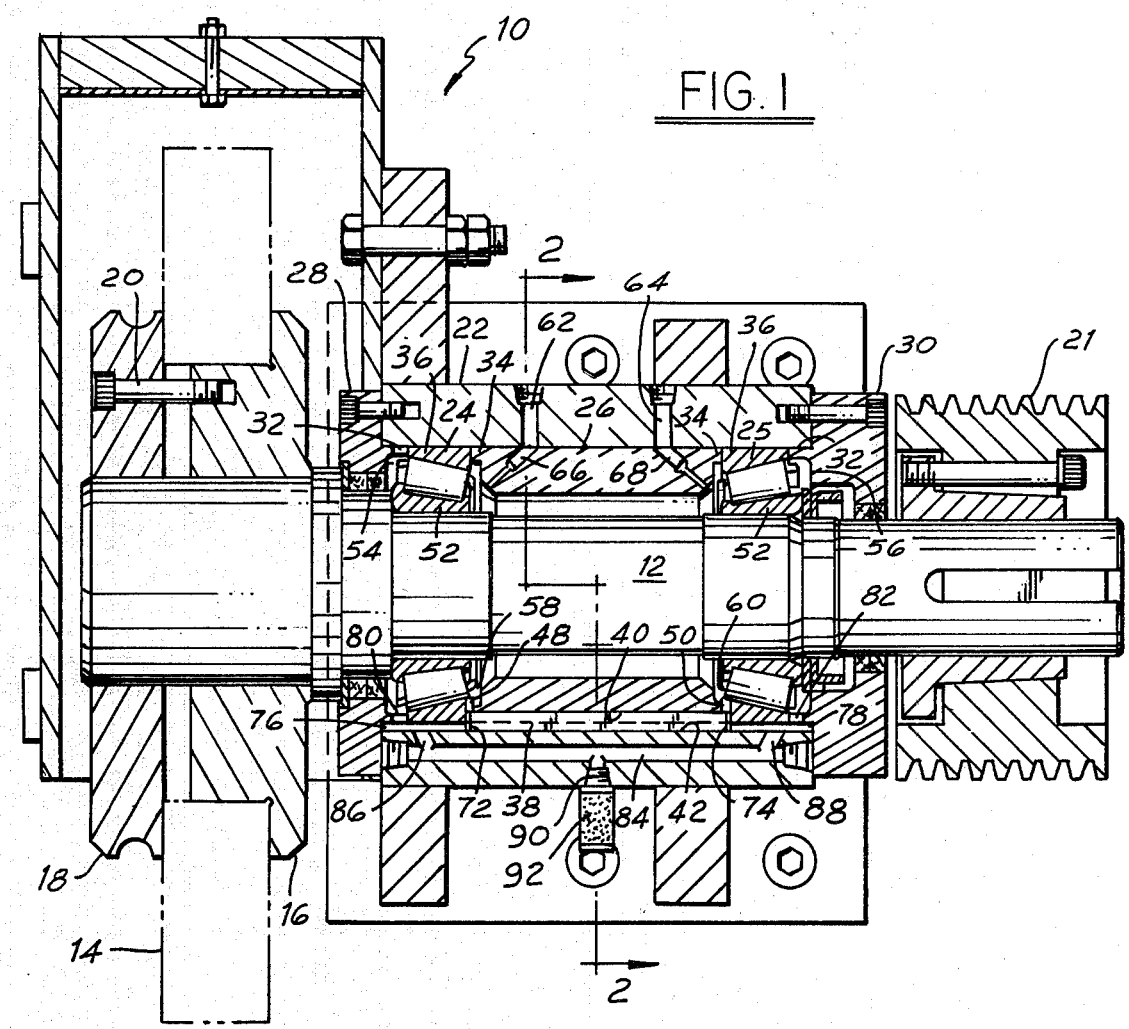
FIG. 1 is a longitudinal sectional view taken on the line 1—1 in FIG. 2 showing a mounting and lubrication system for spindle bearings in a grinding machine, in accordance with our invention.

Referring now more particularly to the drawings, the numeral 10 designates a grinder having a shaft or spindle 12 provided with a grinding wheel 14 secured to its outer end for grinding metal slabs, billets and the like. The wheel 14 is held on one end of shaft 12 by any suitable means, as by a hub 16 shrunk on the shaft and a removable clamping ring 18 secured to the hub 16 by bolts 20. A driving pulley 21 is mounted on the opposite end of shaft 12. A grinder is just one of numerous applications in which the bearing mounting and lubrication system of this invention may be employed.

Shaft 12 is supported in cylindrical housing 22 by bearings 24 and 25. The bearings 24 and 25 are located by a cylindrical spacer 26 disposed between the bearings and end retainers 28 and 30 which are bolted or otherwise suitably secured to opposite ends of the housing 22. The retainers 28 and 30 have circular projections 32 and the spacer 26 has circular projections 34, which projections engage the outer bearing rings 36 to properly locate the bearings axially.

Relative rotation between the outer rings 36 and the housing 22 is prevented by an elongated key 38 fitted in a longitudinally extending slot or seat 40 in the outer surface of spacer 26 and in a registering longitudinally extending keyway or slot 42 in the inner surface of housing 22. The ends of the key 38 enter notches or slots 48 and 50 in the outer rings 36, thus securing the outer rings 36, and also the spacer 26, against any relative circumferential motion with respect to housing 22. A second key 38', seated in slots 40' and 42' in the spacer and housing and having its ends entering notches in the outer bearing rings, may also be provided if desired (see FIG. 2).

The inner bearing rings 52 are secured on the shaft 12 as by a shrink fit.

There are annular cavities 54 and 56 between each bearing and one of the retainers 28 or 30, and annular cavities 58 and 60 between each bearing and the spacer 26.

Lubricant, preferably air-borne, enters housing 22 through passages 62 and 64. Spacer 26 has passages 66 and 68 which are disposed in axial and circumferential alignment with passages 62 and 64 to insure uninhibited lubricant flow to the bearings. A suitable air pump (not shown) may be used to pump lubricant to passages 62 and 64 through fittings 70 (one of which is shown in FIG. 2).

The centrifugal force induced by the rotating elements of bearings 24 and 25 will pump most of the lubricant through the bearings and into annular cavities 54 and 56. Any excess lubricant which is not thus pumped through the bearings will collect in annular cavities 58 and 60.

Key 38 has end notches or slots 72 and 74 which register and are in direct communication with slots 48 and 50 in the outer bearing rings. Bearing ring slots 48 and 50 are in direct communication with the cavities 58 and 60 and key slots 72 and 74 are in direct communication with end areas 76 and 78 of housing keyway 42. The excess lubricant in cavities 58 and 60 will flow by gravity through registering slots 48 and 72 and registering slots 50 and 74 into end portions or areas 76 and 78 of housing keyway 42 beyond the ends of the key 38. The bearing locating projections 32 of retainers 28 and 30 are provided with notches or slots 80 and 82 which are disposed in circumferential alignment with keyway 42 and provide direct communication between cavities 54, 56 and keyway 42. Lubricant which has accumulated in cavities 54 and 56 will flow by gravity through slots 80 and 82 into the end areas 76 and 78 of the housing keyway 42. To insure such gravity flow, the keyway 42 is preferably located at or near the lowest point of housing 22.

The housing 22 has a drain passage 84, which may be a drilled hole plugged at the ends as shown, located at the lowest point of the housing. Drain passage 84 communicates with the end areas 76 and 78 of keyway 42 by connecting passages 86 and 88. A drain outlet 90 permits the discharge of all lubricant from cavities 54, 56, 58 and 60 via the routings as described to prevent the accumulation of excess lubricant in the bearings.

Windage and friction will generate a certain amount of heat in bearings even in the presence of properly regulated lubrication. When the equipment is stopped, it will cool off, and the heat-expanded air within the housing will contract. Such contraction will pull air into the housing via drain outlet 90. A filter member 92 is provided in outlet 90 to permit the discharge of lubricant during operation, and also to permit the entrance of air during cooling, while inhibiting the entrance of airborne solid contaminants.

We claim:

1. A spindle bearing and lubrication system comprising a housing, a pair of bearings in said housing rotatably supporting a shaft, means for axially locating said bearings in said housing in spaced relation to one another, said locating means including spacer means between and engaging the adjacent ends of said bearings, and retainer means engaging the remote ends of said bearings, said spacer means cooperating with each bearing to define an inner lubricant cavity, said retainer means cooperating with each bearing to define an outer lubricant cavity, said housing and locating means having lubricant inlet passages leading to at least one cavity associated with each bearing for the lubrication of each bearing and for the flow of lubricant through each bearing to the other cavity associated therewith, said housing having lubricant outlet passage means, connecting passage means providing communication between each of said other cavities and said lubricant outlet passage means, and a key, said housing and said bearings having slots in which said key is received to prevent said bearings from rotating relative to said housing, portions of said slot in said housing comprising portions of said connecting passage means.

2. A spindle bearing and lubrication system comprising a housing, a pair of bearings in said housing rotatably supporting a shaft, means for axially locating said bearings in said housing in spaced relation to one another, said locating means including spacer means between and engaging the adjacent ends of said bearings, and retainer means engaging the remote ends of said bearings, said spacer means cooperating with said bearings to define inner lubricant cavities, said retainer means cooperating with said bearings to define outer lubricant cavities, said housing and locating means having lubricant inlet passages leading to at least one cavity associated with each bearing for the lubrication of each bearing and for the flow of lubricant through each bearing to the other cavity associated therewith, said housing having lubricant outlet passage means, connecting passage means providing communication between all said cavities and said lubricant outlet passage means, a key to prevent said bearings from rotating relative to said housing, said housing having a slot in which said key is received, and slots in said retainer means, said slots in said housing and retainer means comprising portions of said connecting passage means.

3. A system as defined in claim 2, wherein said connecting passage means from each outer lubricant cavity leads through the slot in one of said retainer means and through the slot in said housing in direct sequence to said outlet passage means.

4. A spindle bearing and lubrication system comprising a housing, a pair of bearings in said housing rotatably supporting a shaft, means for axially locating said bearings in said housing in spaced relation to one another, said locating means including spacer means between and engaging the adjacent ends of said bearings, and retainer means engaging the remote ends of said bearings, said spacer means cooperating with said bearings to define inner lubricant cavities, said retainer means cooperating with said bearings to define outer lubricant cavities, said housing and locating means having lubricant inlet passages leading to at least one cavity associated with each bearing for the lubrication of each bearing and for the flow of lubricant through each bearing to the other cavity associated therewith, said housing having lubricant outlet passage means, connecting passage means providing communication between all said cavities and said lubricant outlet passage means, a key, said housing and said bearings having slots in which said key is received to prevent said bearings from rotating relative to said housing, said key having slots, said slots in said housing, bearings and key comprising portions of said connecting passage means.

5. A spindle bearing and lubrication system comprising a housing, a pair of bearings in said housing rotatably supporting a shaft, means for axially locating said bearings in said housing in spaced relation to one another, said locating means including spacer means between and engaging the adjacent ends of said bearings, and retainer means engaging the remote ends of said bearings, said spacer means cooperating with said bearings to define inner lubricant cavities, said retainer means cooperating with said bearings to define outer lubricant cavities, said housing and locating means having lubricant inlet passages leading to at least one cavity associated with each bearing for the lubrication of each bearing and for the flow of lubricant through each bearing to the other cavity associated therewith, said housing having lubricant outlet passage means, connecting passage means providing communication between all said cavities and said lubricant outlet passage means, a key, said housing and said bearings having slots in which said key is received to prevent said bearings from rotating relative to said housing, slots in said retainer means and in said key, said slots in said housing, bearings, retainer means and key comprising portions of said connecting passage means.

6. A system as defined in claims 3 or 5, wherein said connecting passage means from each inner lubricant cavity leads through one of said bearing slots, one of said key slots, and said housing slot in direct sequence to said outlet passage means.

7. A spindle bearing and lubrication system comprising a housing, a pair of bearings in said housing rotatably supporting a shaft, means for axially locating said bearings in said housing in spaced relation to one another, said locating means including spacer means between and engaging the adjacent ends of said bearings, and retainer means engaging the remote ends of said bearings, said spacer means cooperating with said bearings to define inner lubricant cavities, said retainer means cooperating with said bearings to define outer lubricant cavities, said housing and locating means having lubricant inlet passages leading to at least one cavity associated with each bearing for the lubrication of each bearing and for the flow of lubricant through each bearing to the other cavity associated therewith, said housing having lubricant outlet passage means, connecting passage means providing communication between all said cavities and said lubricant outlet passage means, a key, said housing and said bearings having slots in which said key is received to prevent said bearings from rotating relative to said housing, the ends of said key being located adjacent said respective bearings, said housing slot having portions extending beyond the ends of said key, a slot in each retainer means providing direct communication between the associated outer cavity and one end portion of said housing slot, each end of said key having a slot in direct communication with one end portion of said housing slot and with the slot of the adjacent bearing, said bearing slots being in direct communication with said respective inner cavities, said end portions of said housing slot having direct communication with said outlet passage means, said slots in said housing, bearings, retainer means and key comprising portions of said connecting passage means.

8. A system as defined in claim 7, including a filter in said outlet passage means permitting discharge of lubricant but preventing the entrance of solid contaminants in the event of reverse flow.

* * * * *